(12) United States Patent
Johnson

(10) Patent No.: US 8,262,299 B2
(45) Date of Patent: Sep. 11, 2012

(54) PANORAMIC CAMERA MOUNT

(76) Inventor: Joseph Johnson, San Luis Obispo, CA (US)

( * ) Notice: Subject to any disclaimer, the term of this patent is extended or adjusted under 35 U.S.C. 154(b) by 0 days.

(21) Appl. No.: 13/293,648

(22) Filed: Nov. 10, 2011

(65) Prior Publication Data

US 2012/0070144 A1   Mar. 22, 2012

Related U.S. Application Data

(63) Continuation of application No. 12/655,419, filed on Dec. 29, 2009, now Pat. No. 8,075,203, which is a continuation of application No. 11/327,265, filed on Jan. 5, 2006, now Pat. No. 7,658,556.

(60) Provisional application No. 60/642,045, filed on Jan. 7, 2005.

(51) Int. Cl.
*G03B 17/00* (2006.01)

(52) U.S. Cl. .................................... 396/428; 248/187.1

(58) Field of Classification Search .................. None
See application file for complete search history.

(56) References Cited

U.S. PATENT DOCUMENTS

| | | | | |
|---|---|---|---|---|
| 4,763,151 | A * | 8/1988 | Klinger | 396/419 |
| 4,929,973 | A * | 5/1990 | Nakatani | 248/177.1 |
| 6,773,172 | B1 * | 8/2004 | Johnson et al. | 396/428 |
| 7,077,582 | B2 * | 7/2006 | Johnson | 396/428 |
| 7,185,862 | B1 * | 3/2007 | Yang | 248/187.1 |
| D602,974 | S * | 10/2009 | Zen | D16/245 |
| 7,658,556 | B2 * | 2/2010 | Johnson | 396/428 |
| 8,075,203 | B2 * | 12/2011 | Johnson | 396/428 |
| 2006/0175482 | A1 * | 8/2006 | Johnson | 248/176.1 |

* cited by examiner

*Primary Examiner* — Clayton E Laballe
*Assistant Examiner* — Bret Adams
(74) *Attorney, Agent, or Firm* — Chernoff Vilhauer McClung & Stenzel

(57) ABSTRACT

A panoramic device includes a base member and a clamp member rotatably interconnected within a single plane of rotation with the base that includes a first rotatable knob to selectively inhibit the rotation of the clamp member with respect to the base. The upper surface includes a central region that is at a different elevation than another portion of the upper surface. The clamp includes a pair of opposed surfaces suitable to detachably secure a camera thereto. The one of the opposed surfaces is maintained in a fixed relationship with respect to the clamp member. The other one of the opposed surfaces is in a movable relationship with respect to the clamp member using a second rotatable knob. The first knob and the second knob are rotatably connected with respect to one another.

16 Claims, 12 Drawing Sheets

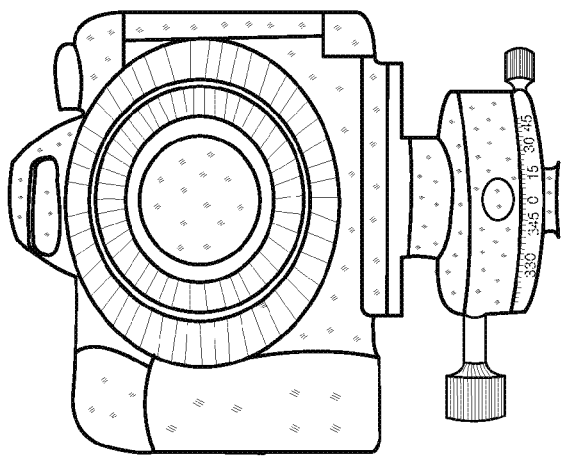
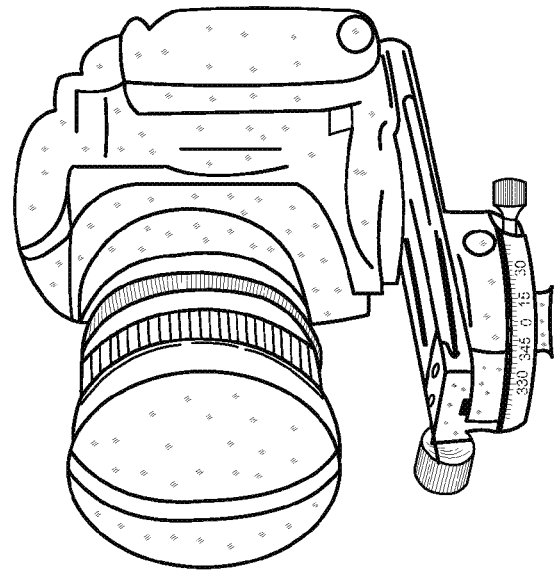
Fig. 14
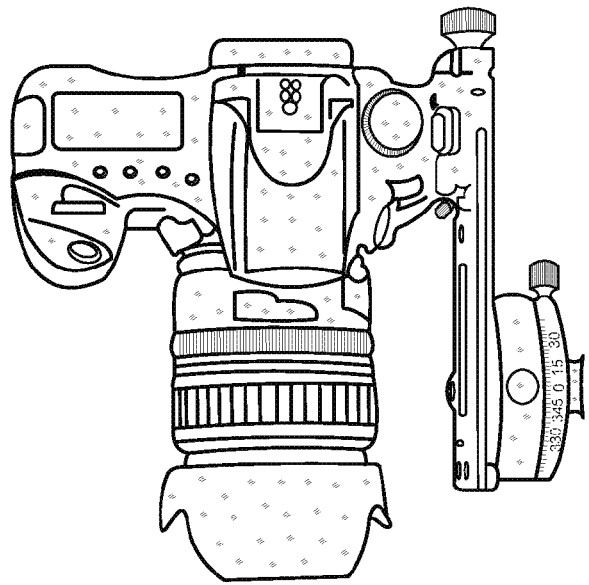

PANORAMIC CAMERA MOUNT

CROSS-REFERENCE TO RELATED APPLICATIONS

This application is a continuation of U.S. patent application Ser. No. 12/655,419, filed Dec. 29, 2009, now U.S. Pat. No. 8,075,203 B2, which application is a continuation of U.S. patent application Ser. No. 11/327,265, filed Jan. 5, 2006, now U.S. Pat. No. 7,658,556, which claims the benefit of U.S. Provisional App. No. 60/642,045, filed Jan. 7, 2005.

BACKGROUND OF THE INVENTION

The present invention generally relates to a camera mount, and in particular to a camera mount suitable for taking panoramic pictures.

Aberrations and distortions occur at the edge regions of a wide-angle view of a landscape. Taking and assembling together multiple images across the view results in a panoramic that is larger than is generally available using a single shot picture. Properly aligning film strips or digital images to produce a panoramic picture can be a difficult task. This task is especially difficult if the camera is not properly centered on a rotatable mount.

A panoramic camera is disclosed in Gasso et al., U.S. Pat. No. 2,111,854, that includes an adjustable lens to vary the focal length of the lenses in mathematical proportions to the varying distances of objects in the panoramic view.

Campbell et al., U.S. Pat. No. 3,183,810 disclose a motor-driven panoramic camera having automatic means for stopping the angular sweep of the camera and adjustments for changing the angle of sweep and for making the sweep symmetrical or unsymmetrical.

Blankenhorn, U.S. Pat. No. 1,282,177, discloses a system for making panoramic pictures comprising marking the film as the film is advanced and the camera rotated.

A camera mount useful for taking stereoscopic or panoramic pictures is disclosed by Ianuzzi in U.S. Pat. No. 2,782,700.

BRIEF DESCRIPTION OF THE SEVERAL VIEWS OF THE DRAWINGS

FIG. 14 illustrates a panning assembly in a seventh position.

DETAILED DESCRIPTION OF PREFERRED EMBODIMENT

For a vertical column of overlapping images, a panning clamp should have a vertical orientation. One technique to achieve this orientation is to mount a panning clamp on top of a tripod head or otherwise directly to a tripod. To more effectively use the panning clamp, the camera and lens should be mounted so that the camera and lens pivot around the nodal point or the entrance pupil. In most cases, this involves the camera and lens being backed off from the typical tripod mounting point so that the entrance pupil is located at the pivot point.

Figure 1:
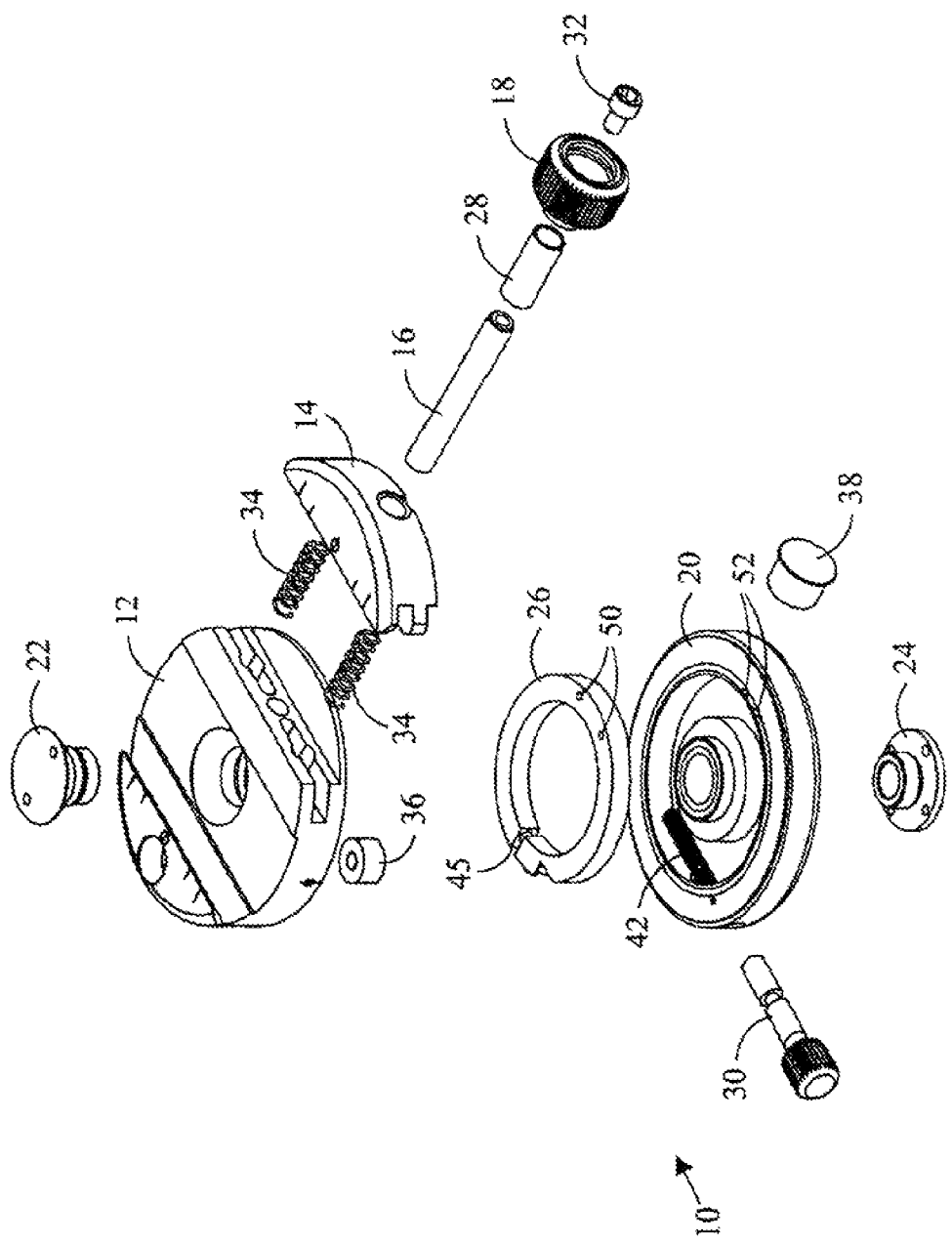
FIG. 1 illustrates an assembly drawing of a panning clamp.

Referring to FIG. 1, a panning clamp 10 includes a clamp body 12 and a clamp jaw 14. The clamp jaw 14 is engaged with the body 12 by a pair of clamp springs 34. The springs 34 exert an outwardly directed force on the clamp jaw 14. The clamp jaw 14 is secured in place by the combination of a clamp screw 16, a clamp sleeve 28 surrounding the clamp screw 16, a clamp knob 18, and a screw 32. The clamp sleeve 28 sets the spacing for the clamp knob 18 and presses against the exterior of the clamp jaw 14. As the clamp knob 18 is released the clamp jaw 14 will be pressed outwardly thereby opening the clamp and keeping the clamp jaw 14 in tension to maintain it in a suitable position. As the clamp knob 18 is tightened, the clamp jaw 14 will be pressed inwardly thereby closing the clamp and securing any plate or other imaging equipment (e.g., camera, video camera, etc.) therein. A plug 22 may be secured over the opening in the body 12. A plastic cover 38 may be secured over the end of the clamp knob 18.

In order to ensure that the top surface of the panning clamp 10 is level, a bubble level 36 may be included. The top of the bubble level 36 is preferably approximately flush with the upper surface of the panning clamp 10. With the panning clamp 10 attached to a support, such as a ball head, the panning clamp 10 is brought into a level position so that upon rotation an accurate set of panoramic images may be obtained.

A panning base 20 includes a recess therein into which supports a cinching ring 26. The cinching ring 26 may be secured to the panning base 20 by securing pins through a pair of openings 50 in the cinching ring 26 and a matching pair of openings 52 in the panning base 20. A cinching knob 30 attached to a stud 42 is engaged with a threaded gap 45 in the cinching ring 26. A retaining member 24 is secured to the plug 22 in such a manner to maintain the panning base and the body 12 together with the desired ability to freely rotate.

Figure 2:
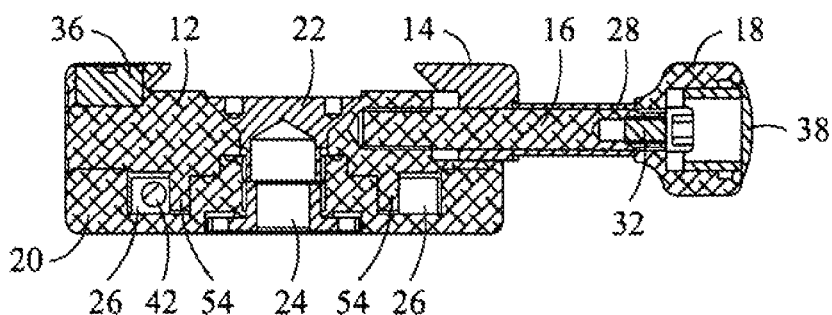
FIG. 2 illustrates a cut-away view along line C-C of FIG. 3.
Figure 3:
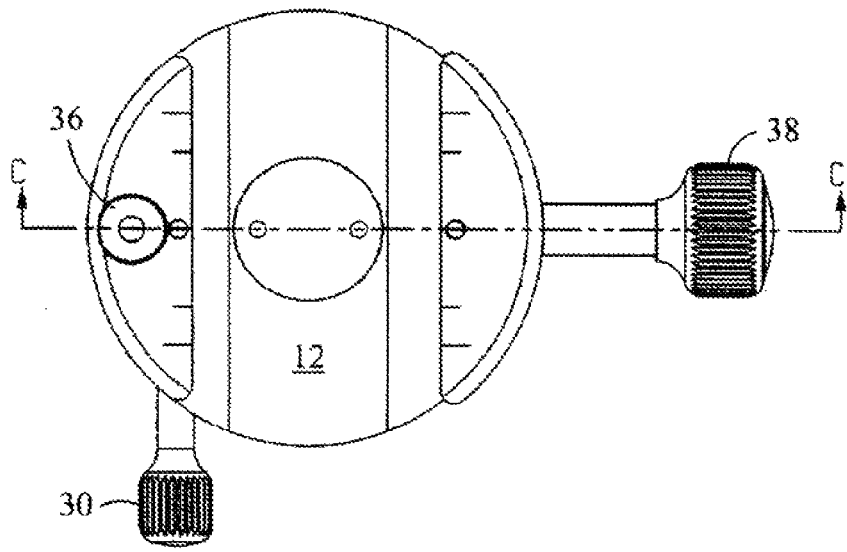
FIG. 3 illustrates a top view of an assembled panning clamp of FIG. 1

Referring also to FIG. 2, which is a section along line C-C of FIG. 3, the cinching ring 26 surrounds a lower portion 54 of the clamp body 14. When the user desires to permit free rotational motion of the clamp body 12 with respect to the panning base 20, the cinching knob 30 is released, which releases the cinching ring 26. When the user desires to inhibit free rotational motion of the clamp body 12 with respect to the panning base 20, the cinching knob 30 is tightened, which decreases the diameter of the cinching ring 26. The decreased diameter of the cinching ring 26 results in significant frictional engagement between the cinching ring 26 and the lower portion 54 of the clamp body 12. The cinching ring 26 and the lower portion 54 preferably have mating surfaces along 50% or more, 75% or more, or 90% or more of the circumference of the surfaces. This results in selective rotational movement of the panning clamp 10.

Figure 4:
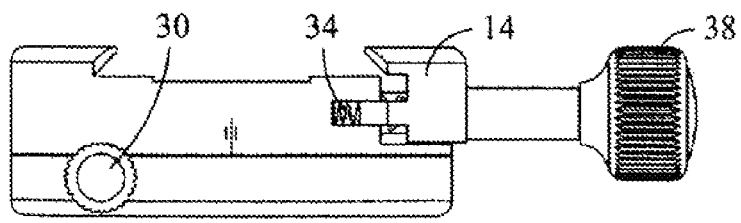
FIG. 4 illustrates a side view of an assembled panning clamp of FIG. 1.
Figure 5:
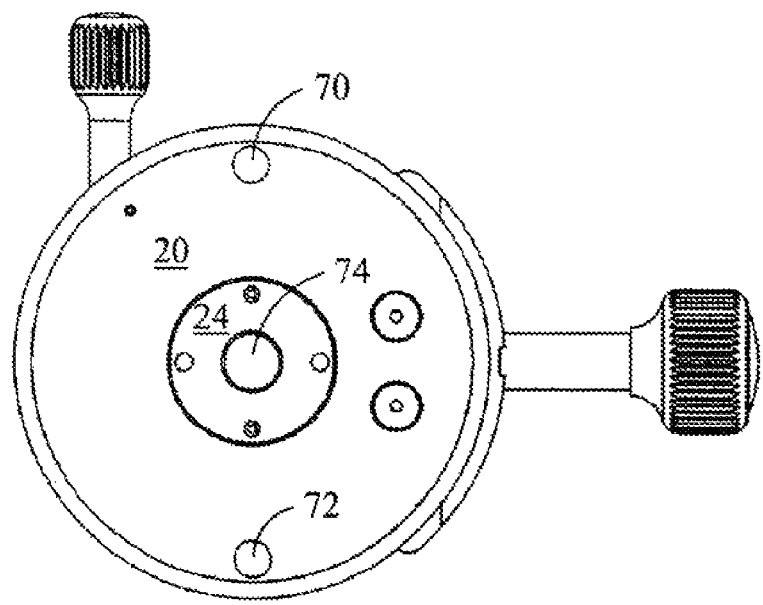
FIG. 5 illustrates a bottom view of an assembled panning clamp of FIG. 1.
Figure 6:
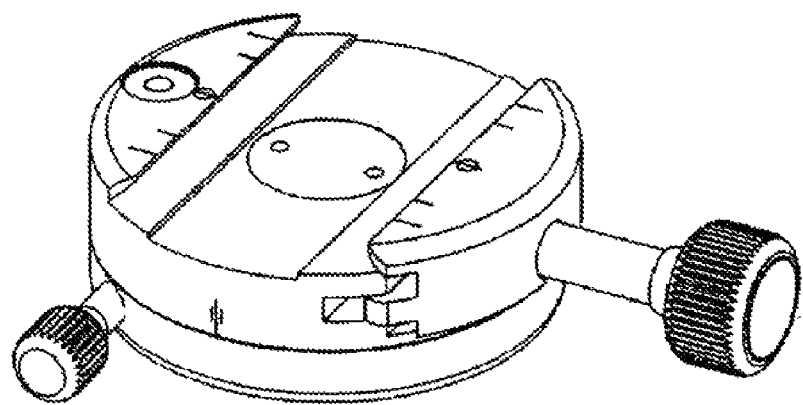
FIG. 6 illustrates a pictorial view of an assembled panning clamp of FIG. 1.

FIG. 4 illustrates a side view with the clamp jaw 14 extended by the springs 34. With the clamp jaw 14 retracted, a plate or other member may be readily inserted within the panning clamp 10. With the clamp jaw 14 engaged, the plate or other member is securely held in place within the panning clamp 10. FIG. 5 illustrates the base of the panning clamp 10 with a pair of threaded openings 70 and 72 suitable for securing the panning clamp 10 to a plate or other member. Also, the central opening 74 may be used to secure the panning clamp 10 to a plate or other member. FIG. 6 illustrates a pictorial view of an assembled panning clamp 10.

The panning clamp 10 itself preferably only includes the ability for rotational movement, and not the ability to rotate, in order to ensure accurate panning. It is to be understood that the rotational movement preferably has some reasonable amount of friction at all times so that the panning clamp 10 does not rotate without some reasonable pressure being exerted. In this manner, even without the panning function being locked the panning clamp 10 will not tend to rotate without the user's turning of the clamp body 14. In addition, the panning clamp 10 should have a height that is less than 50% of the diameter of the panning clamp 10.

Figure 7:
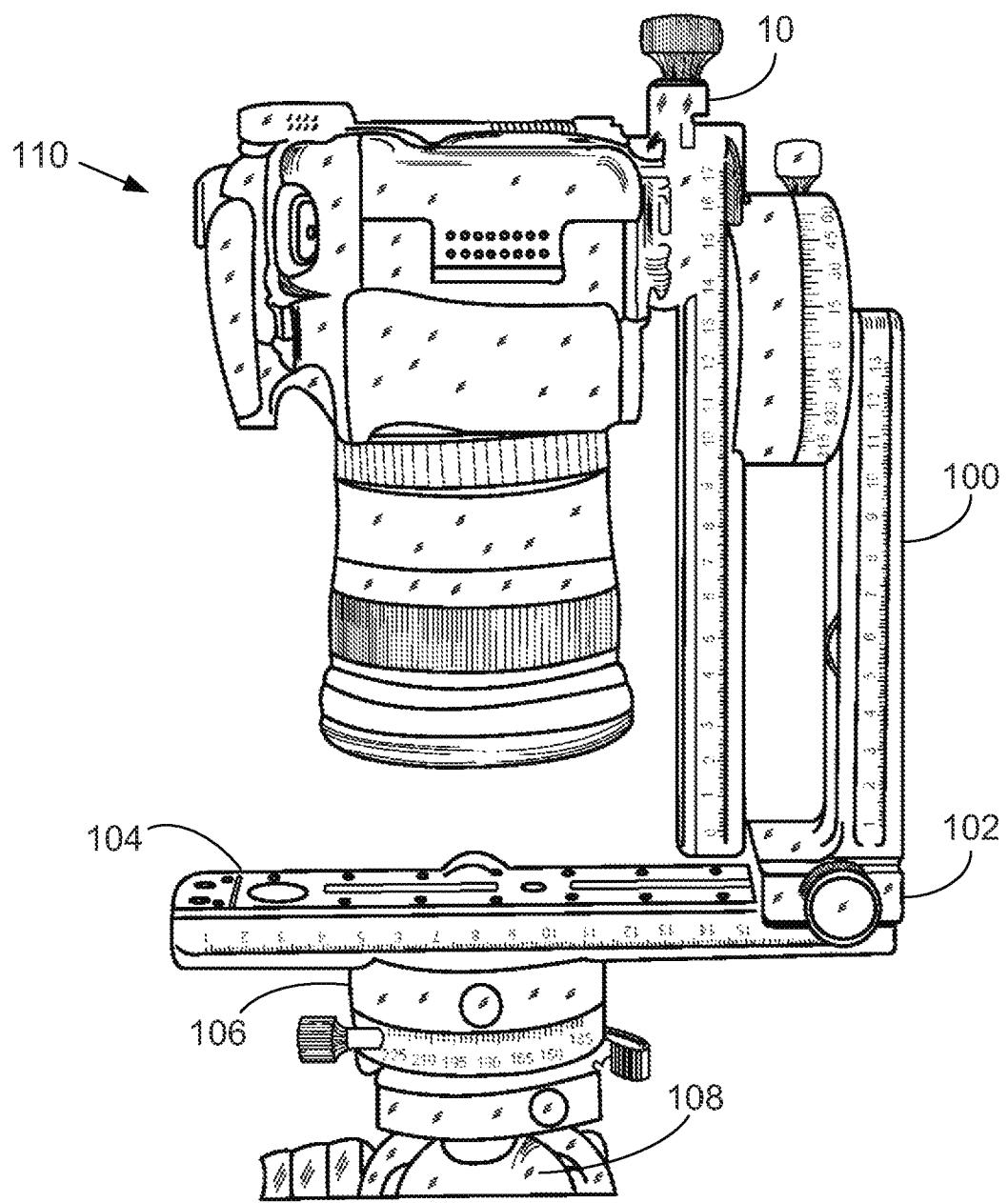
FIG. 7 illustrates a panning assembly in a first position.
Figure 8:
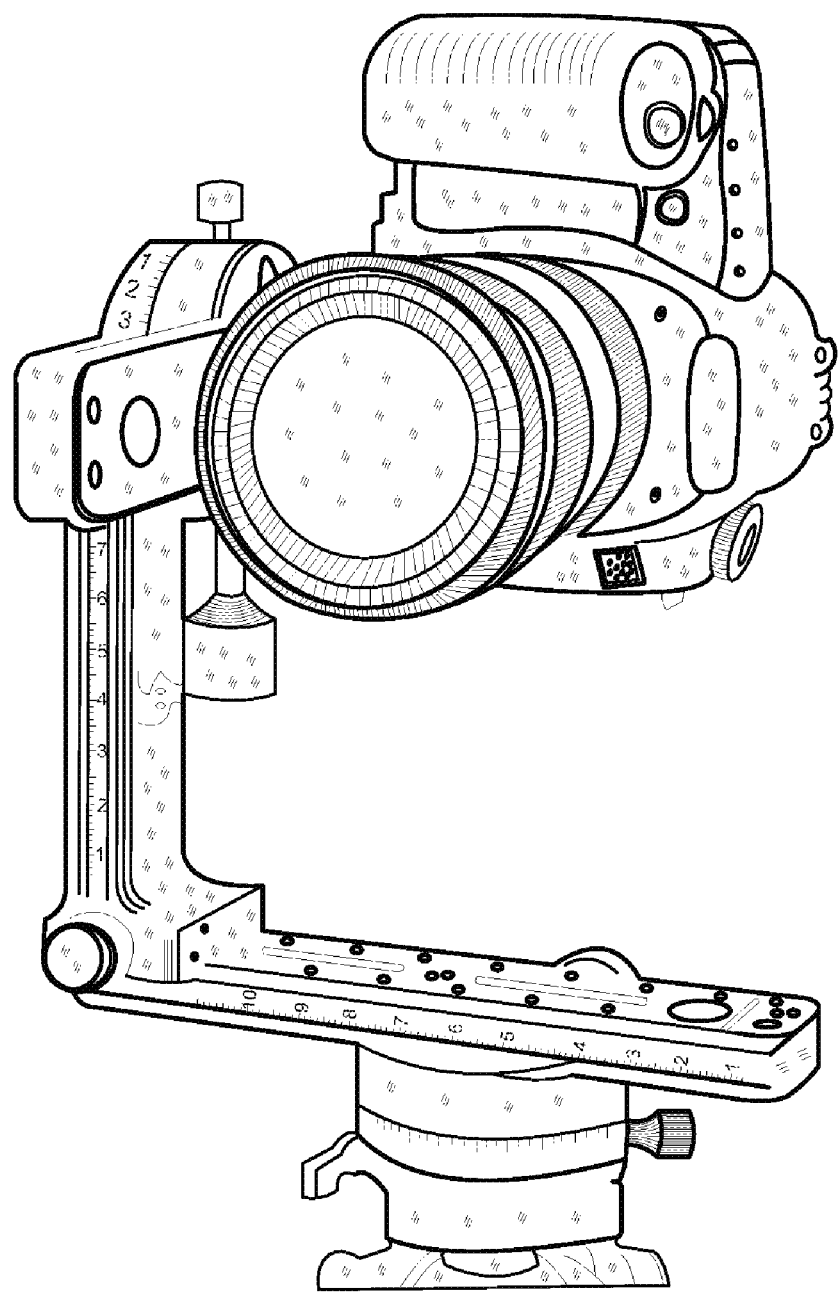
FIG. 8 illustrates a panning assembly in a second position.
Figure 9:
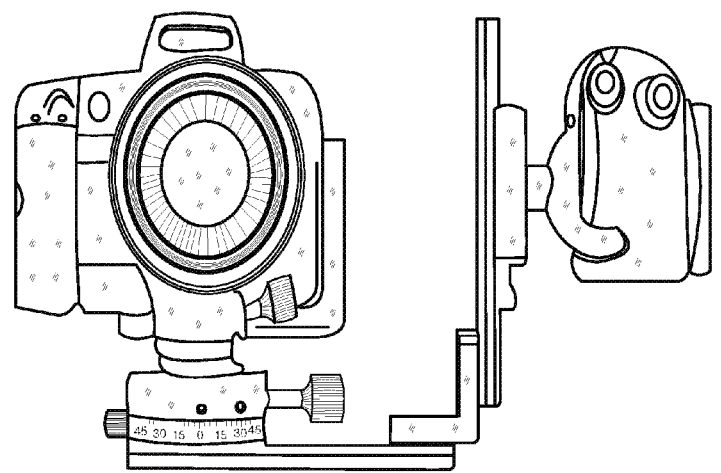
FIG. 9 illustrates a panning assembly in a third position.
Figure 10:
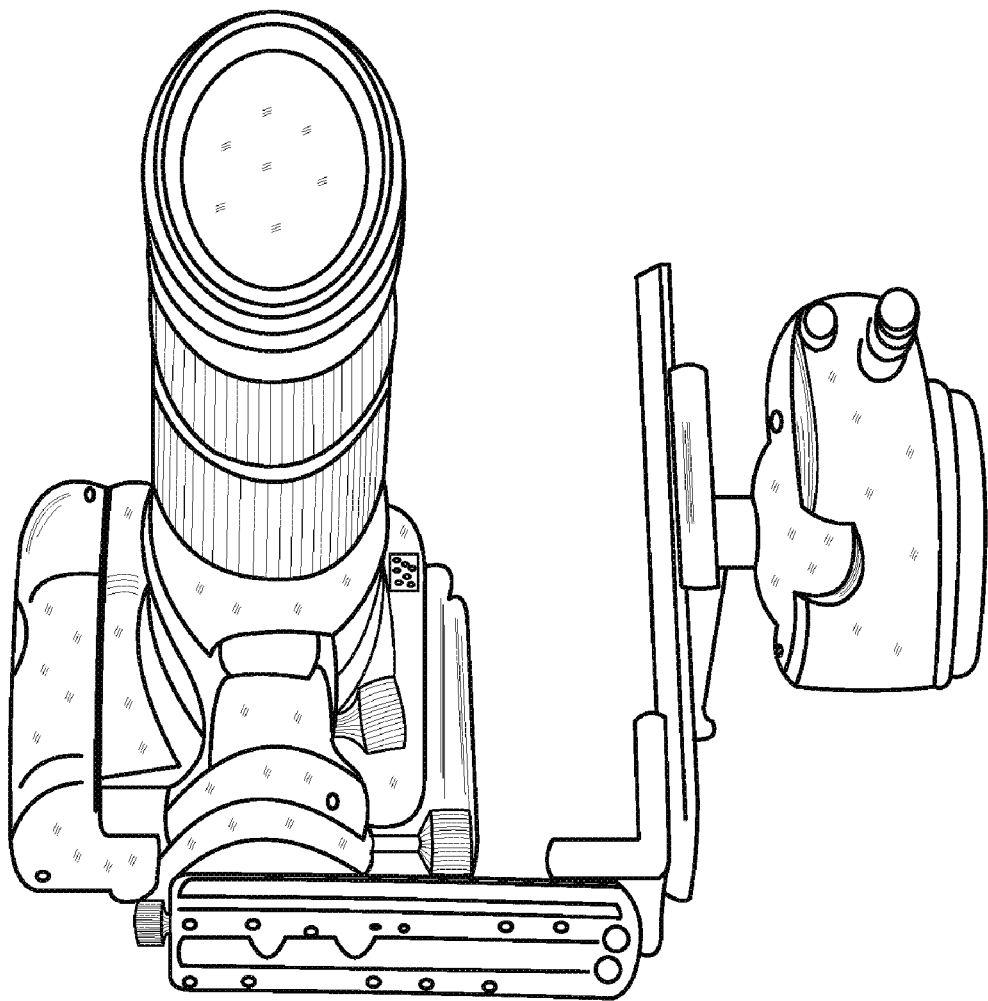
FIG. 10 illustrates a panning assembly in a fourth position.
Figure 11:
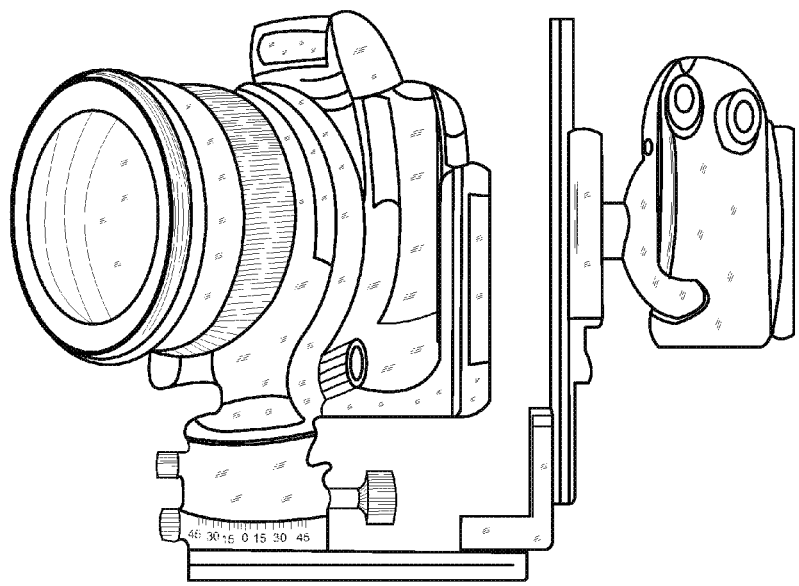
FIG. 11 illustrates a panning assembly in a fifth position.

Referring to FIG. 7, a camera 110 may be supported by the panning clamp 10. The panning clamp 10 permits selective rotational movement of the camera 110. The panning claim 10 is supported by a bracket 100. The bracket 100 is supported at a 90 degree (or substantially 90 degrees) angle with respect to a bracket 104 by an "L" shaped bracket 102. The bracket 104 is detachable engageable to a clamp 106 supported by a ball head 108. FIGS. 8, 9, 10, and 11 illustrate other orientations for the camera 110.

Figure 12:
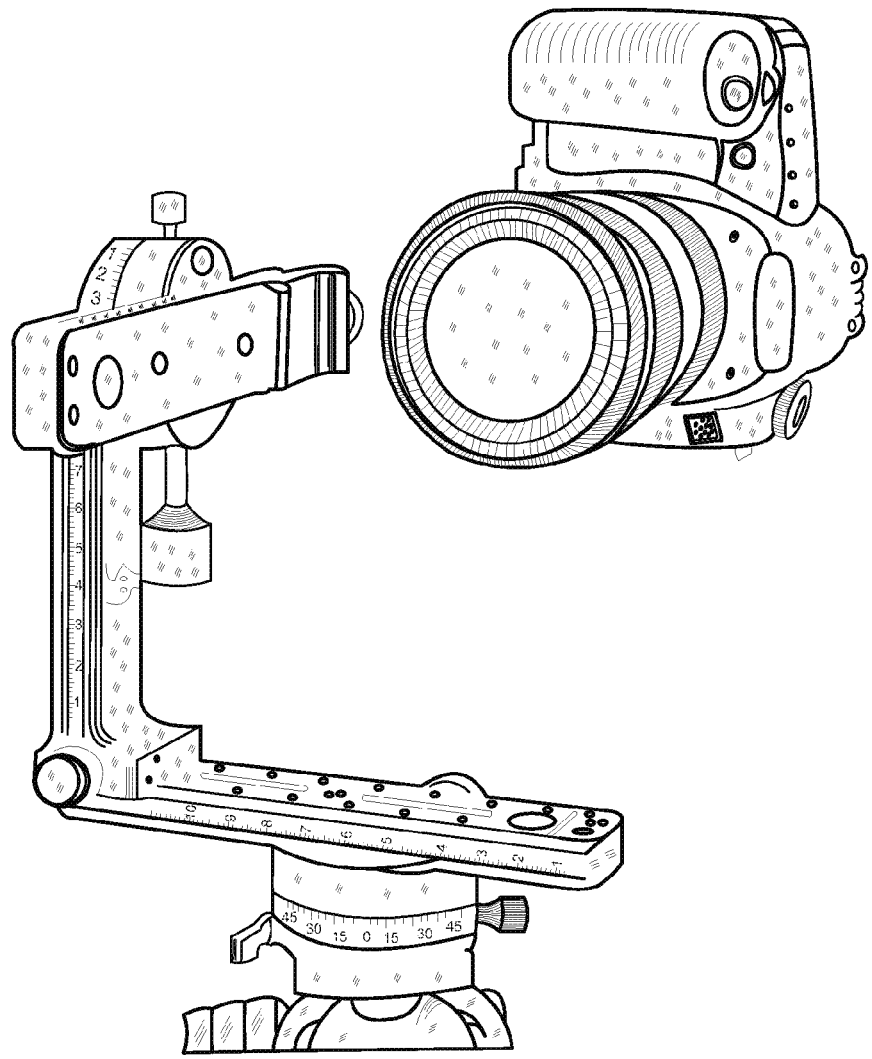
FIG. 12 illustrates a bracket.
Figure 13:
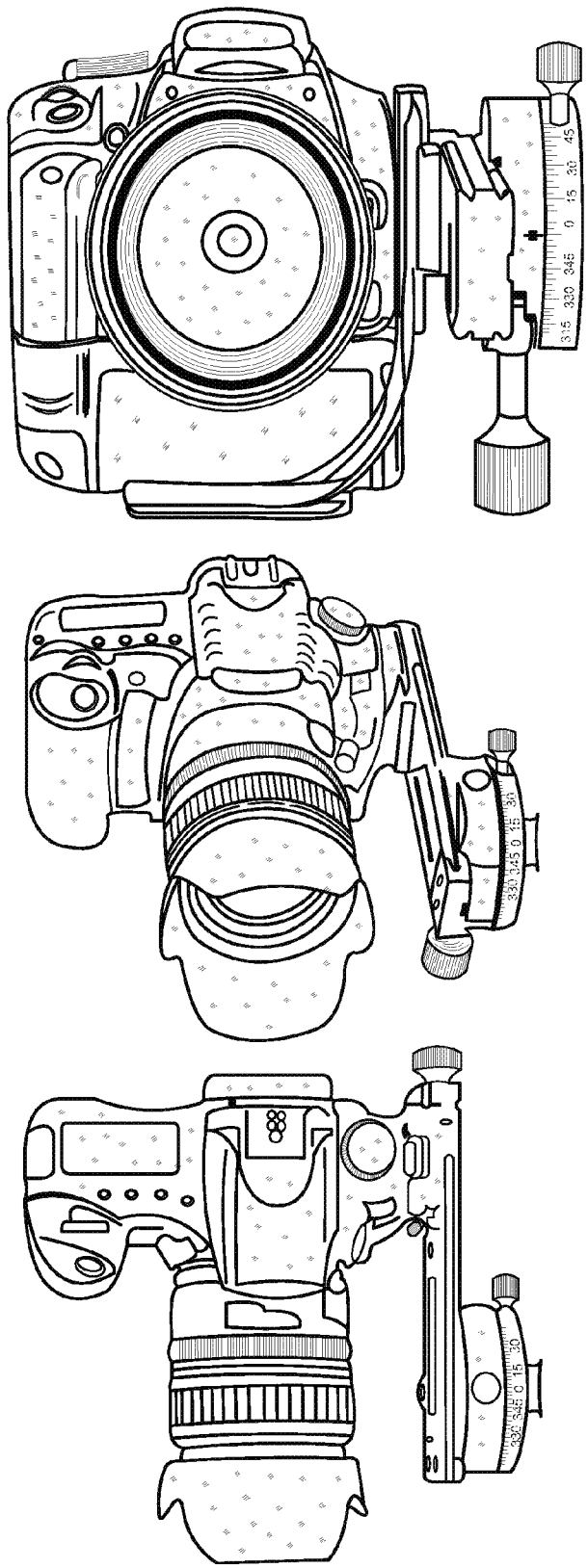
FIG. 13 illustrates a panning assembly in a sixth position.
Figure 15:
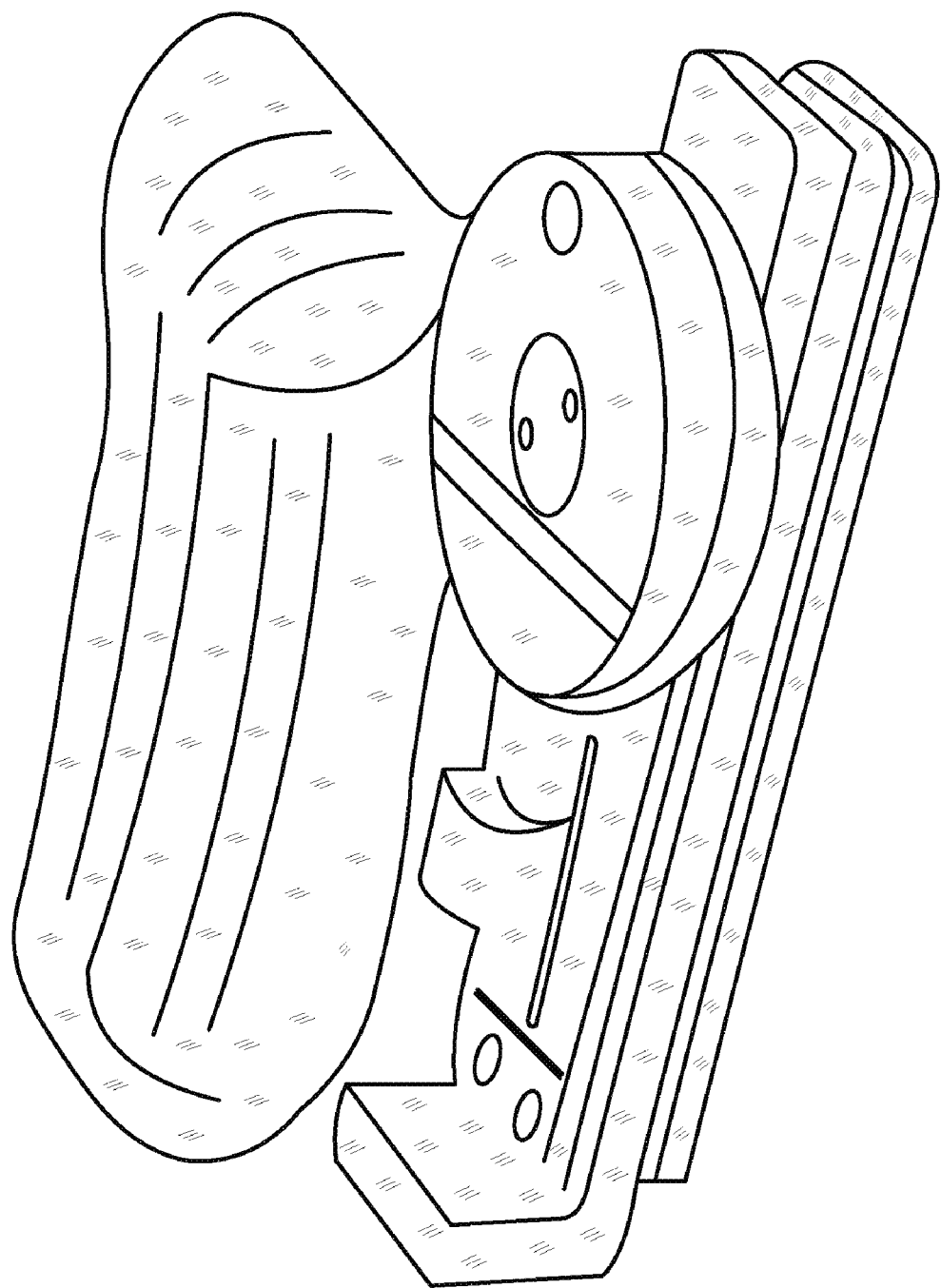
FIG. 15 illustrates a panning assembly in a disassembled arrangement.

Referring to FIG. 12, the bracket 100 may include a clamp mechanism 125 at one end thereof along with a notch 127 along both of its sides. Other types of brackets may likewise be used, as desired. Referring to FIG. 13, the camera, bracket, and panning clamp illustrate the proper positioning of the camera in a vertical position with respect to axis of rotation of the panning clamp. Referring to FIG. 14, the camera, bracket, and panning clamp illustrate the proper positioning of the camera in a horizontal position with respect to axis of rotation of the panning clamp. Referring to FIG. 15, a compact assembly may include a pair of brackets 100, 104, an "L" shaped bracket 102, and a panning clamp 10, all arranged in a stacked manner so that they are readily stored in a rectangular pouch 133.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A panoramic device comprising:
   (a) a base having a planar first surface suitable for supporting said base;
   (b) a first clamp member secured for rotation to said base and comprising a first clamp surface rotatable about a single axis substantially normal to said first surface;
   (c) a second clamp member slidably secured to said first clamp member and movable by rotation of a first screw to approach said first clamp surface and clamp an article therebetween and movable by reversing rotation of said first screw to separate from said first clamp surface to release an article clamped between said first clamp surface and said second clamp member; and
   (d) a clinching ring secured against rotation relative to one of said base and said first clamp member and having a dimension reducible by rotation of a second screw to impede relative rotation of said first clamp member and said base and increasable by reversing rotation of said second screw to release said first clamp member for rotation relative to said base.

2. The panoramic device of claim 1 further comprising a bias mechanism that biases said second clamp member away from said first clamp surface.

3. The panoramic device of claim 2 wherein said bias mechanism includes at least one spring.

4. The panoramic device of claim 2 wherein said bias mechanism includes at least two springs.

5. The panoramic device of claim 1 wherein said first screw is in threaded engagement with said first clamp member.

6. The panoramic device of claim 4 wherein said first screw passes through a portion of said second clamp member.

7. The panoramic device of claim 6 further comprising a sleeve surrounding a portion of said first screw.

8. The panoramic device of claim 7 further comprising a knob attached to said first screw.

9. The panoramic device of claim 1 further comprising a level bubble visible at an upper surface of said panoramic device.

10. The panoramic device of claim 9 wherein said level bubble is approximately flush with the upper surface of said panoramic device.

11. The panoramic device of claim 1 wherein said clinching ring is at least partially circular.

12. The panoramic device of claim 11 wherein said clinching ring is attached to at least one of said base member and said first clamp member.

13. The panoramic device of claim 12 wherein said dimensional reduction of said clinching ring produces a pressing engagement with a portion of one of said base and said first clamp member.

14. The panoramic device of claim 13 wherein said pressing engagement includes at least 50% of a surface of said clinching ring.

15. The panoramic device of claim 13 wherein said pressing engagement includes at least 75% of a surface of said clinching ring.

16. The panoramic device of claim 13 wherein said pressing engagement includes at least 90% of a surface of said clinching ring.

* * * * *